Nov. 23, 1965 K. K. CLAGGETT 3,219,149
FOOD CONVEYOR SYSTEM FOR RESTAURANTS
Filed April 15, 1963 4 Sheets-Sheet 1

INVENTOR.
K. K. CLAGGETT

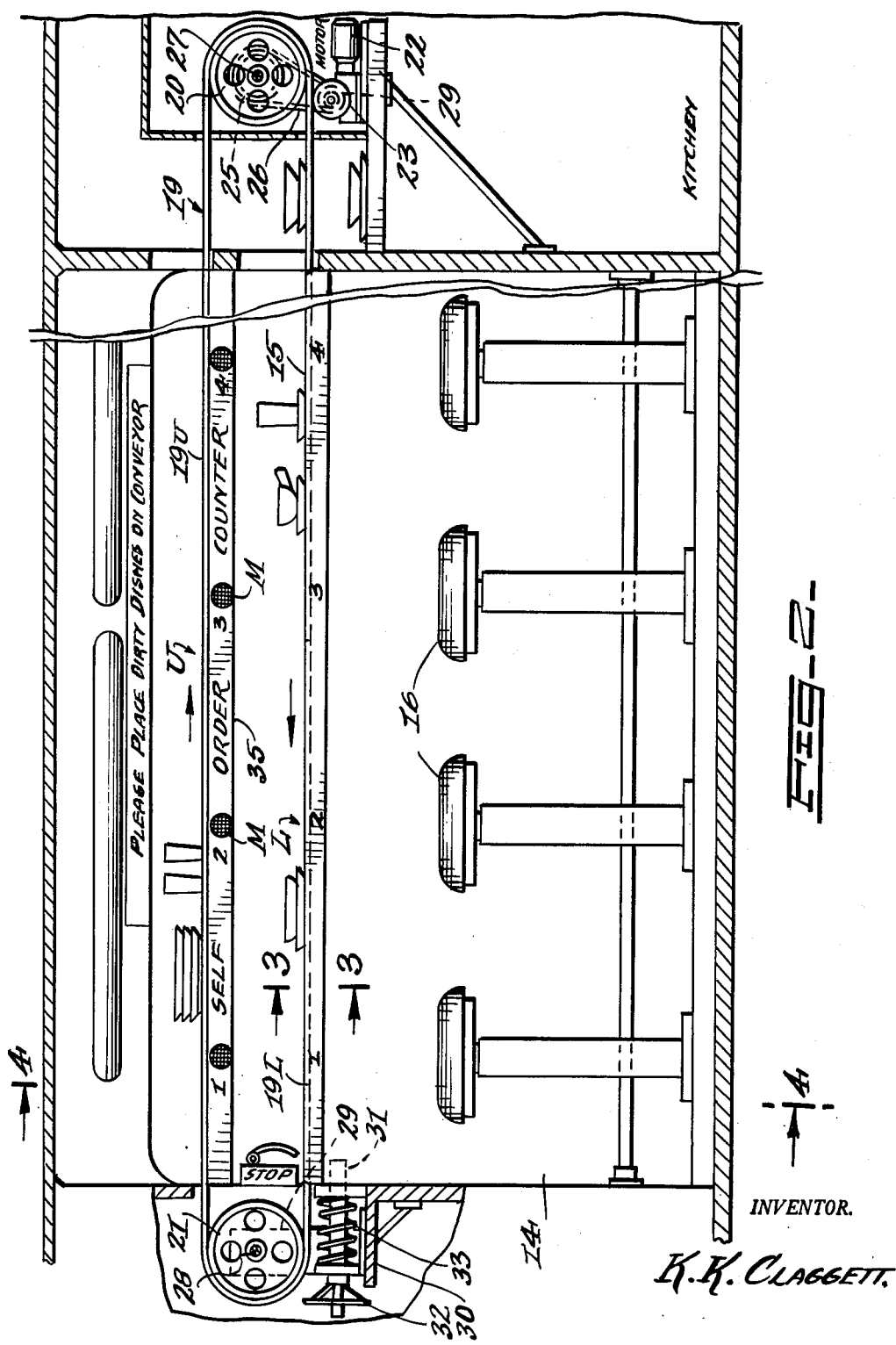

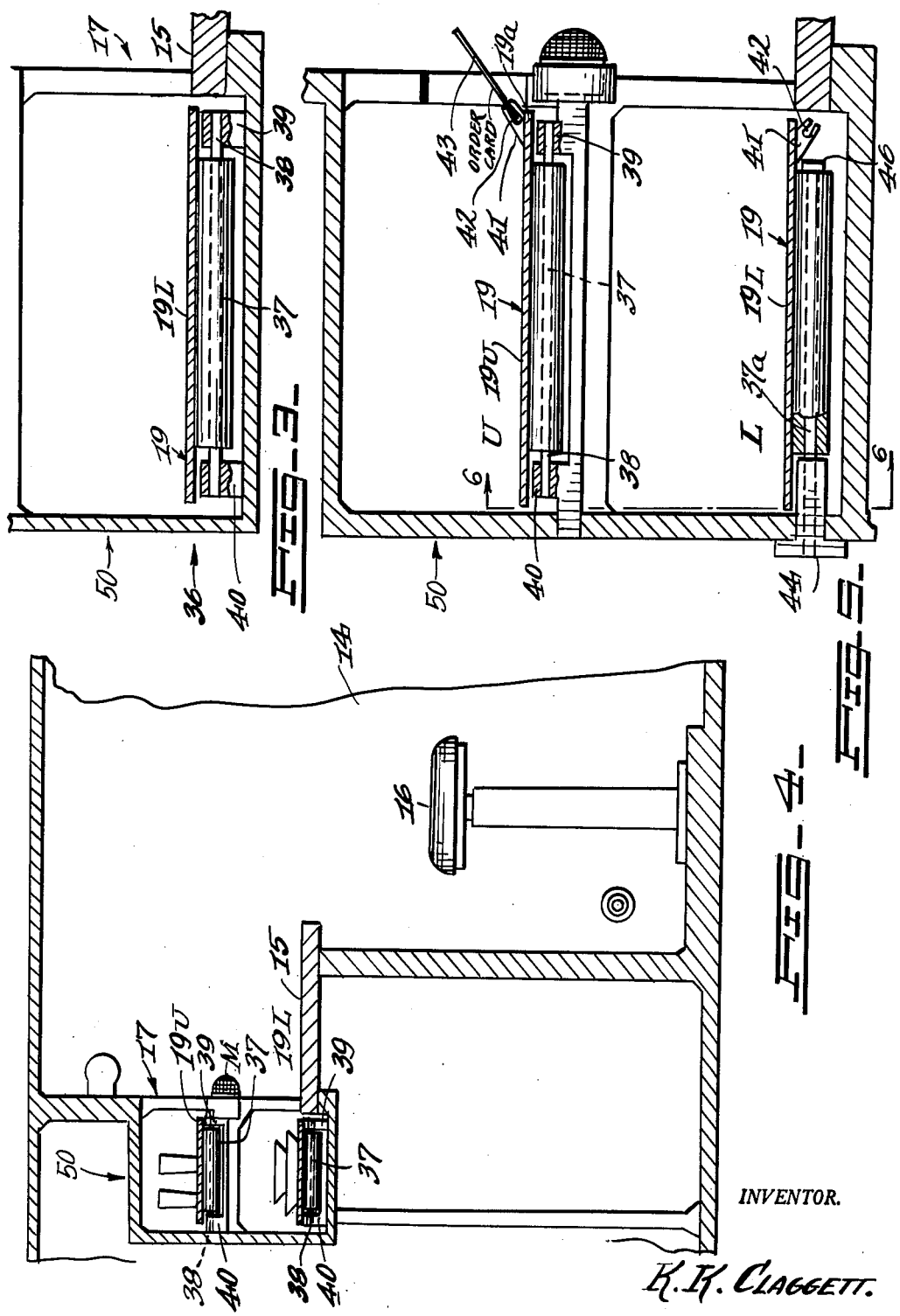

INVENTOR.
K. K. CLAGGETT 3,219,149
FOOD CONVEYOR SYSTEM FOR
RESTAURANTS
Kermit K. Claggett, 823 Missouri St., Lawrence, Kans.
Filed Apr. 15, 1963, Ser. No. 272,931
4 Claims. (Cl. 186—1)

The present invention relates to restaurants, and more particularly to restaurant food conveyor systems. The primary object of this invention is to provide a conveyor system which may deliver food from the kitchen to the restaurant's counter automatically so as to dispense entirely with the need for restaurant help.

Another object of this invention is to provide a self order restaurant system in which a customer may place his order directly from the counter to the kitchen, and in which food may be served directly from the kitchen to the counter by means of an endless conveyor belt.

Another object of this invention is to provide a restaurant food conveyor system which is inexpensive to manufacture, easy to install, and easy and safe to operate.

Another object of this invention is to provide an endless conveyor belt which may be utilized to deliver food to the restaurant's counter and likewise be utilized to carry dirty dishes from the counter to the kitchen.

An additional object of this invention is to provide an endless conveyor belt for delivering food from the restaurant's kitchen to the counter, and an intercommunication system from the counter to the kitchen to facilitate placing customer's orders by phone.

A further object of this invention is to provide an endless conveyor belt for delivering food from a restaurant's kitchen to the counter and means for affixing to the conveyor belt the customer's orders, which may then be delivered by the belt to the kitchen to be filled.

Another object of this invention is to provide an endless conveyor belt and novel means for keeping the belt taut to prevent slack in the belt.

A further object of this invention is to provide an endless conveyor belt for restaurants wherein roller means for supporting the belt flat are used to facilitate the delivery of dishes from the kitchen to the restaurant without spilling their food contents.

This invention also consists in certain other features of construction, and the combination and arrangement of parts, to be hereinafter fully described, illustrated in the accompanying drawings, and specifically pointed out in the appended claims.

In describing the invention in detail, references will be made to the accompanying drawings, where like character numerals denote like or corresponding parts throughout the several views, in which:

FIG. 2 is a section taken on the line 2—2 of FIG. 1 showing the manner in which the endless conveyor belt delivers food from the restaurant's kitchen to the counter;

FIG. 3 is a section taken on the line 3—3 of FIG. 2 showing the manner in which the conveyor belt is supported by means of rollers;

FIG. 4 is a section taken on the line 4—4 of FIG. 2 showing the manner in which the conveyor belt brings food from the kitchen and removes dirty dishes to the kitchen;

FIGURE 5 is an enlarged view of the conveyor belt assembly section including frame 50, illustrated in FIGURE 4, and illustrates a modification in which a customer's order card from the counter may be taken to the kitchen by the conveyor;

Figure 1:
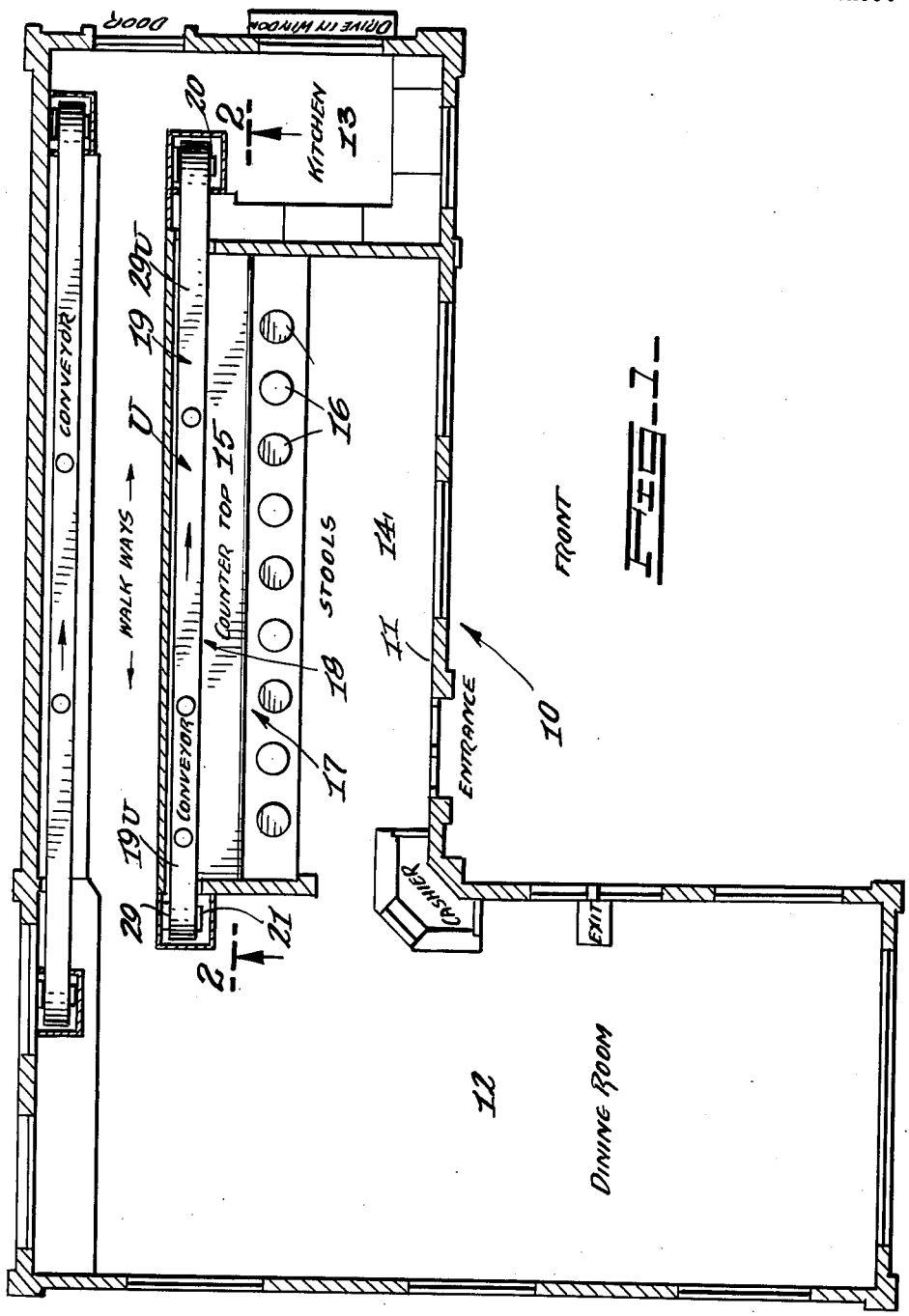
FIG. 1 is a floor plan of a restaurant using the food conveyor system of the present invention.

It is to be understood that the present form of disclosure is merely for the purpose of illustration and that there might be devised various modifications thereof, without departing from the spirit of the invention as herein set forth.

Referring now more particularly to the drawings, the floor plan of my self order restaurant 10, arranged in accordance with the present invention, comprises, in combination, the building 10, having the foundations and walls indicated by 11 with its dining room 12, the kitchen 13, and the counter room 14.

From FIG. 1 it may be seen that the counter room may be provided with a long counter top 15 sitting from 7 to 15 people (or even more) and with the stools 16. In the wall of the counter room, facing the customers there is the service section 17 which receives the endless belt conveyor 18. Best seen from FIG. 2 the conveyor belt 19 may be stretched between a pair of flat pulleys 20 and 21, respectively; the pulley 20 being the drive pulley while the pulley 21 is the idler or the driven pulley. By means of the electric motor 22; the gear reduction 23; the driven sprocket 25; and the sprocket chain 26 the drive pulley 20 mounted upon the shaft 27 may be driven at a measured pace. At the opposite end thereof the idler pulley 21 may be mounted to turn upon the shaft 28 which is secured to the upright frame 29; the latter resting upon the shelve 30. A tightening screw 31 with its tightening hand operated wheel 32, by means of the coil spring 33 keeps the endless belt 19 taut to prevent slackening and slippage in the belt conveyor system.

It may be seen that by means of the operation of the electric motor 22, it is now possible to advance the lower section 19L of the endless belt 19 towards the counter room (see arrow marked L) while the upper section 19U of the belt is moving towards the kitchen (see arrow marked U). It becomes clear from the foregoing that by means of the lower section L of the conveyor belt, dishes carrying food from the kitchen may be delivered to the counter, while by means of the upper section U dirty dishes may be removed from the counter to the kitchen. Furthermore, by means of the microphones M (which are mounted to the baseboard 35 of the counter, as shown in FIGURE 2; one microphone for each stool in the counter) it is possible for customers sitting at the counter to give their verbal orders to the kitchen.

From FIG. 3, which is a section taken on the line 3—3 of FIG. 2, it may be seen that the belt 19 rests upon the roller system 36 which is comprised of a plurality of elongated rollers 37 mounted to turn upon the slender shafts 38; with the latter being mounted upon the upright bearings 39 and 40 at either end thereof. The bearings 39 and 40 are mounted in frame 50, illustrated in FIGURES 3–6, which houses and supports the conveyor belt assembly section. While the bearings 39 and 40 are shown in the drawings diagrammatically, they may in fact consist of ball bearings or oilite bearing to reduce friction in the moving conveyor belt. The rollers 37 are mounted close together in tandem, and in parallel rows, to prevent sagging in the conveyor belt and to form a substantially flat surface in the belt upon which food dishes may be safely carried from the kitchen with little vibration or danger of spilling their food contents.

FIG. 5 shows pertinent details of the conveyor system and illustrates a modification thereof. For the purpose of facilitating the delivery of customer's written orders from the counter to the kitchen the belt 19 may be provided with a clip 41 appropriately formed at 42 to receive and to hold securely the order card 43. While the roller 37 in the upper section U of the conveyor is similar in construction to the roller shown in FIG. 3, due to the fact that the clip 41 may interfere with the operation of the conveyor when the endless belt 19 turns to enter the lower portion L thereof, it is necessary to reduce the overall length of the roller 37 to form the shorter roller 37a, substantially as shown in FIG. 5. As illustrated in FIGURE 5, the rollers 37 and 37a are supported on frame 50. Thus, rollers 37 are secured to bearings 39 and 40 on either side of the rollers, said bearings being attached to frame 50.

Because of order card 43, it is not possible to support the roller 37a from the side that order card 43 is mounted on the margin of the belt. Therefore, a single shaft or stud 44 mounted in frame 50, on the side of the roller furthest away from order card 43, is utilized to support the bottom of rollers 37a.

Figure 6:
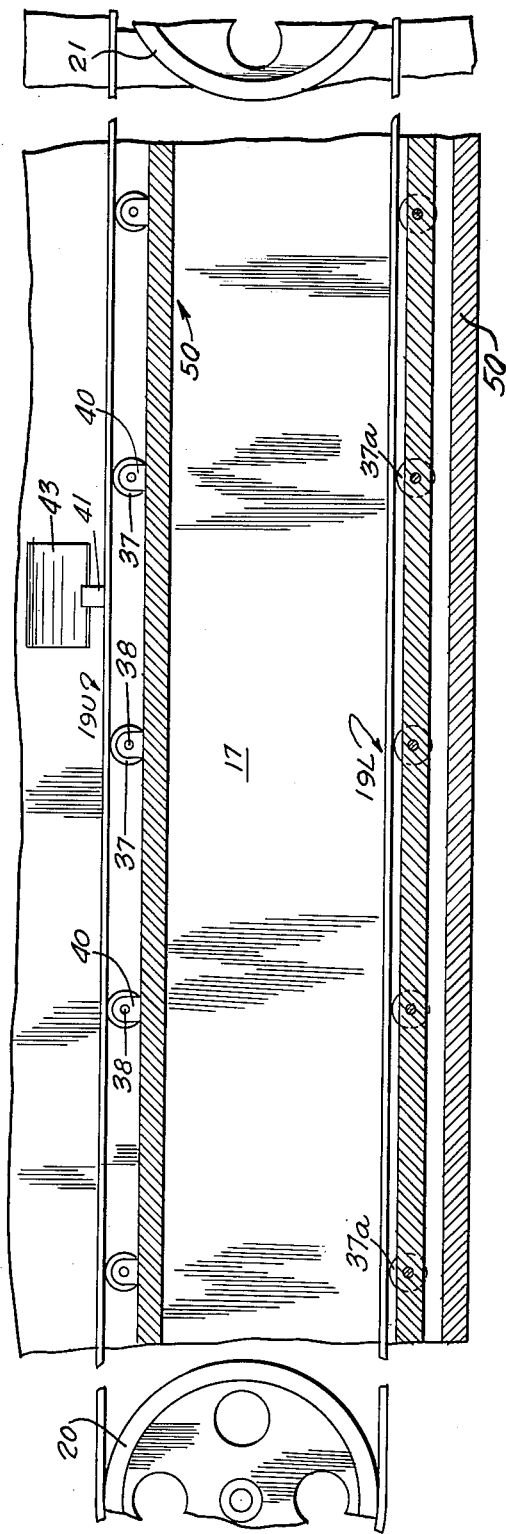
FIGURE 6 is a section view taken along the lines 6—6 of FIGURE 5 and illustrates the plurality of rollers and shafts supporting said rollers.

FIGURE 6 which is a cross-sectional view taken along section line 6—6 of FIGURE 5, illustrates the placement of the plurality of upper and lower rollers, 37 and 37a. As illustrated in FIGURE 6, bearing 40 supports the rollers 37, and stud or shaft 44 supports the rollers 37a. FIGURE 6 also shows one of the plurality of order clips mounted on the upper section 19U of the conveyor belt.

It will now be recognized from FIGS. 1 to 6, inclusive, that the operation of my endless conveyor belt makes possible the delivery of food from the kitchen 13 to the counter 15 by simply ordering the menu over the microphone system M. It is understood that for better indentification purposes of the customer's order, each seat or stool 16 may be provided with identification number corresponding to the number marked upon the mircophone. The customer may give the order and his seat number to the attendant in the kitchen orally, or he may order his meal by means of an order card. When the kitchen attendant places the ordered food upon the conveyor belt, he also may include the order card to help the customer identify his dish upon the belt conveyor. Towards this purpose the clip 41 may carry the order to the kitchen and the card from the kitchen to the counter. This is the card or check the customer takes with him to the cashier's window when paying his bill.

A careful examination of the foregoing description in conjunction with the invention as illustrated in the drawings, will enable the reader to obtain a clear understanding and impression of the features of merit and novelty sufficient to clarify the construction of the invention as hereinafter claimed.

I claim:
1. A food conveyor system between a kitchen and counter room of a restaurant which comprises:

(A) an endless motor driven belt,
(B) a pair of pulleys to which said belt is mounted, said belt comprising an upper section and a lower section running along said counter, said counter being mounted on a frame,
(C) a plurality of clip means, each comprising a clip securely attached to one margin of said moving belt,
(D) a plurality of rollers to support said upper section, and a plurality of rollers to support said lower section of said belt and prevent them from sagging, said lower supporting rollers being substantially shorter than said upper supporting rollers so as to clear said card holding clips from said frame,
(E) a shaft to support each of said lower rollers, said shafts being mounted on said frame and connected to only the ends of said rollers which are furthest away from said clip means,
(F) supporting means mounted on said frame to support said upper section rollers.

2. The food conveyor system as described in claim 1 wherein said pair of pulleys comprises a drive pulley driving an idler pulley:
(G) and means for keeping said endless belt taut to prevent slackening, comprising means for applying spring tension to said idler pulley and means for regulating said spring tension, said regulating means including an adjustable screw and a hand wheel.

3. The food conveyor system as described in claim 1 wherein a plurality of microphones are mounted on said counter to provide communication between said counter room and said kitchen.

4. The food conveyor system as described in claim 1 wherein said clip means are formed to hold an order card, said clips providing spring tension upon said cards to prevent said cards from becoming free, said clips allowing the removal of said cards by a kitchen attendant.

References Cited by the Examiner
UNITED STATES PATENTS

| | | | |
|---|---|---|---|
| 443,488 | 12/1890 | St. Clair | 198—196 |
| 1,681,859 | 8/1928 | Jones | 186—1 |
| 2,017,156 | 10/1935 | Mattler | 186—1 |
| 2,516,985 | 8/1950 | Hecht | 186—1 |
| 2,677,456 | 5/1954 | McCann | 198—208 |

LOUIS J. DEMBO, *Primary Examiner.*
SAMUEL F. COLEMAN, *Examiner.*